July 31, 1934.   J. L. ALEXANDER ET AL   1,968,117
POWER OPERATED DUMP TRUCK
Filed Sept. 6, 1932   4 Sheets-Sheet 4
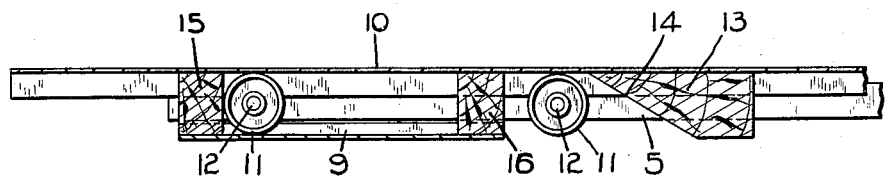
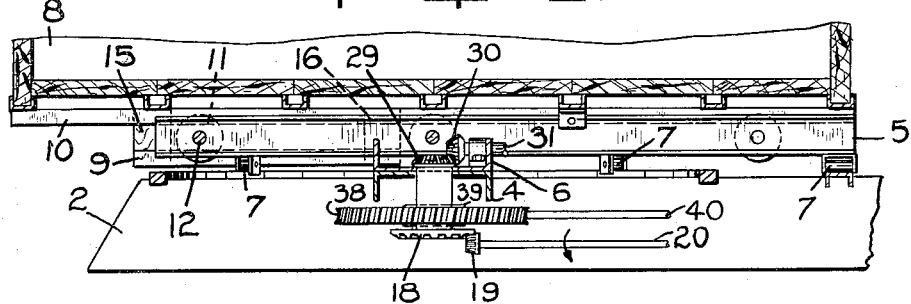
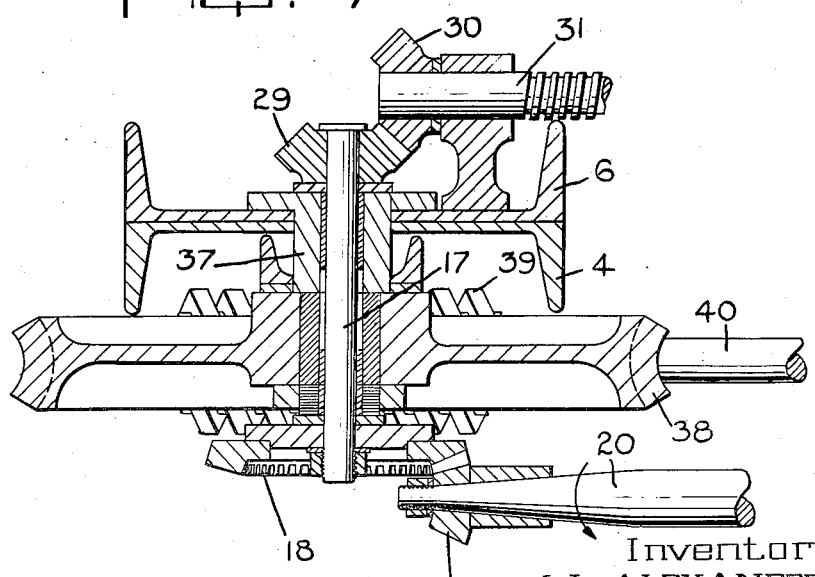
Inventor
J. L. ALEXANDER
E. P. EATON
Attorneys Patented July 31, 1934

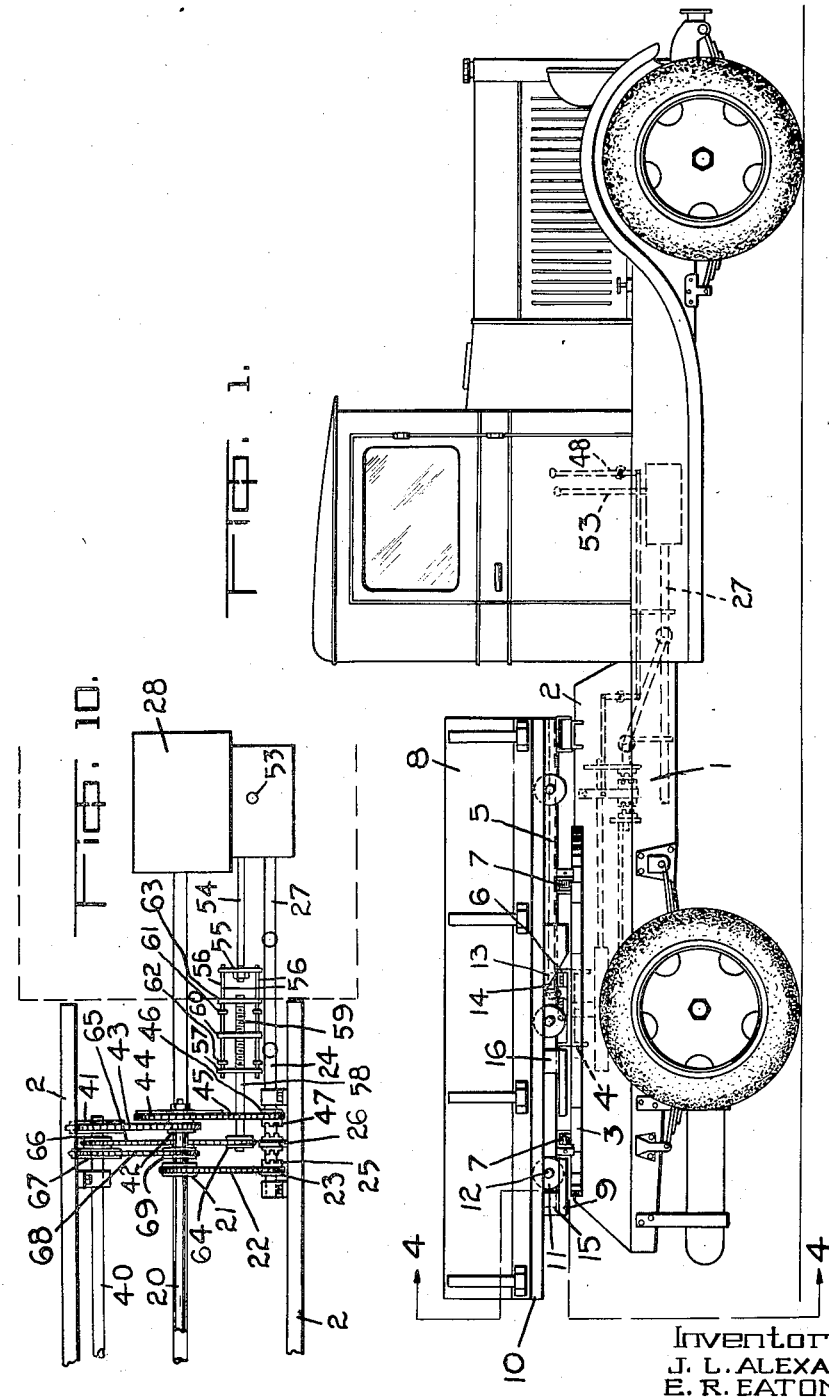

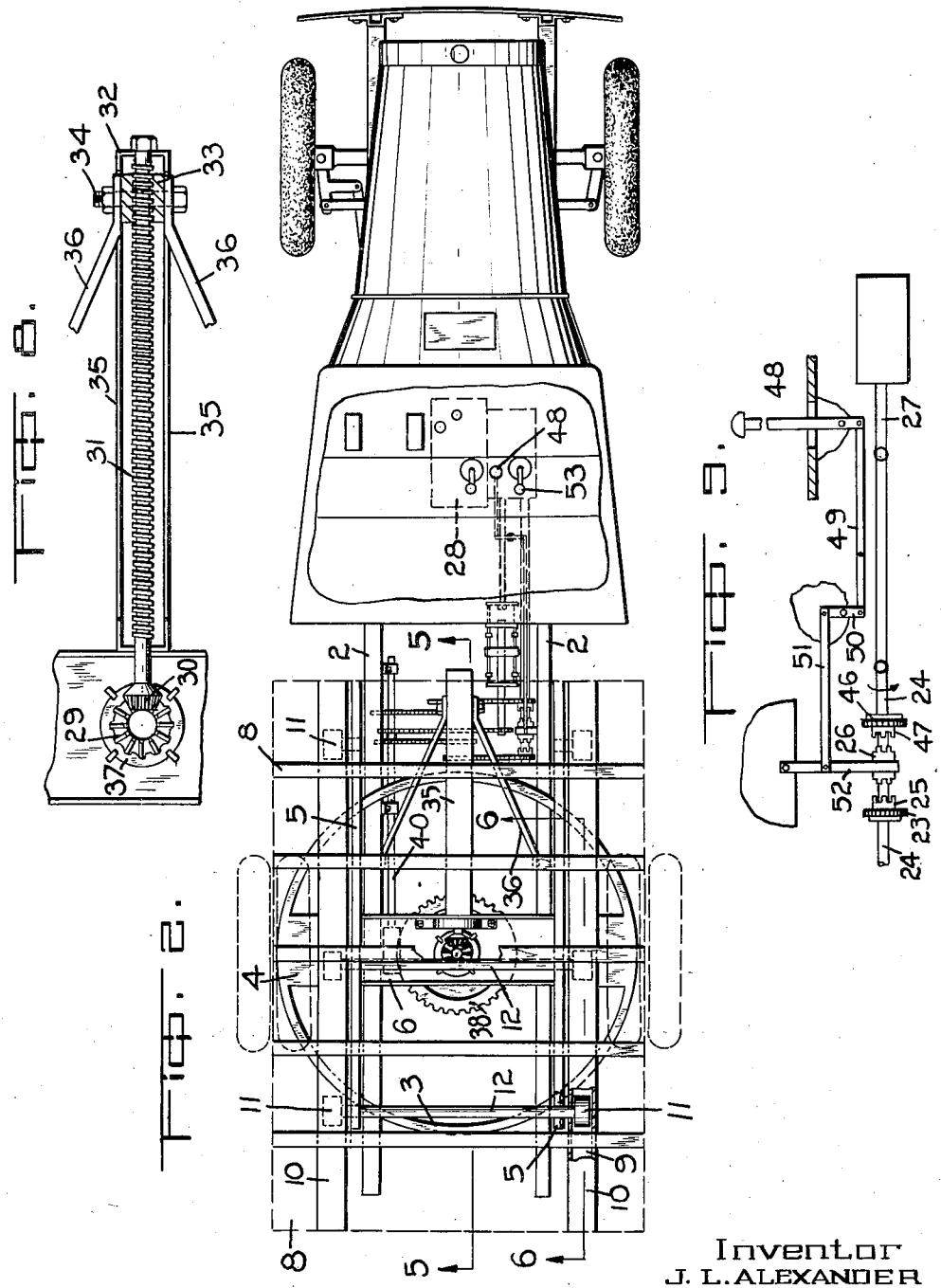

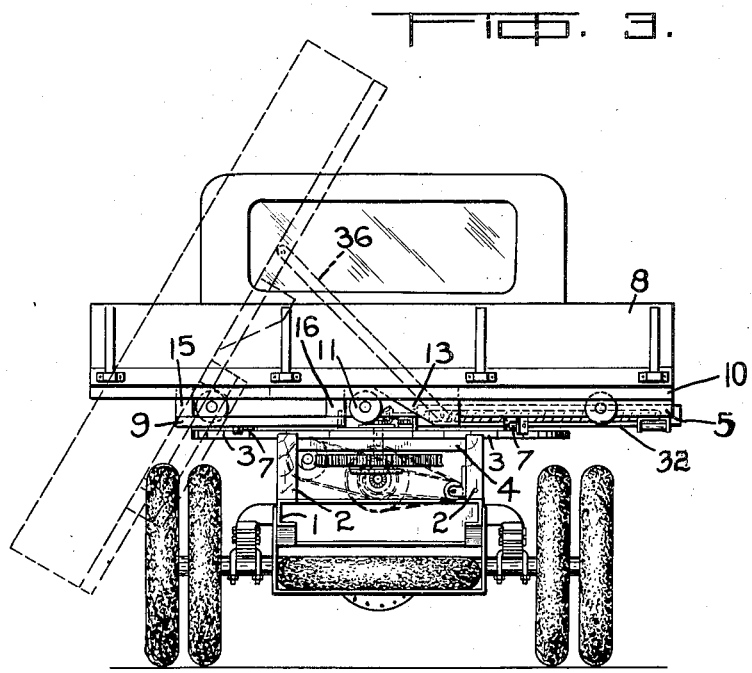
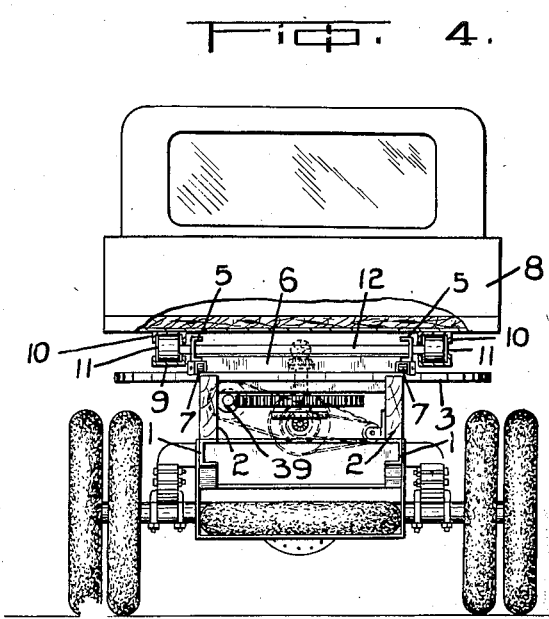

1,968,117

UNITED STATES PATENT OFFICE 1,968,117

POWER OPERATED DUMP TRUCK

James L. Alexander, Toronto, Ontario, and Edwin Russell Eaton, Orillia, Ontario, Canada Application September 6, 1932, Serial No. 631,920

3 Claims. (Cl. 298—9)

Our invention relates to improvements in power operated dump trucks, and the object of the invention is to devise a mechanism actuated from the truck motor for tilting the body as well as for rotating the dump body so that it can be dumped directly over the back of the truck or alternatively over each side.

A further object is to devise means also operated from the truck motor whereby the body or box is moved outwardly prior to tilting in order to throw the centre of gravity of the load in the body outwardly from the normal carrying position and, at the same time, enable the body to be inclined in tilting more nearly to the vertical to dump the load more effectively.

A still further object is to provide means for limiting the inward and outward movement of the body, and yet another object is to devise means for limiting the tilting movement of the body.

With the above and other objects in view which will hereinafter appear as the invention proceeds, our invention consists, in its preferred embodiment, of the construction all as hereinafter more particularly described and illustrated in the accompanying drawings in which:—

Fig. 1 represents a side elevation of a dump truck constructed according to our invention.

Fig. 2 is a plan view with the body or box removed and indicated by the dotted lines.

Fig. 3 is a rear elevation showing the body rotated in to such position as to dump over the left side of the truck, the dotted lines showing the body tilted to dump in such position.

Fig. 4 is a similar view to Fig. 3, the body being in its normal position and part showing section which is taken on the line 4—4 Fig. 1.

Fig. 5 is an enlarged vertical longitudinal section through the line 5—5 Fig. 2.

Fig. 6 is a further enlarged vertical longitudinal section through the line 6—6 Fig. 2.

Fig. 7 is an enlarged vertical section through the gearing for tilting and rotating the body.

Fig. 8 is an enlarged plan view (partly in section) of the means for tilting the truck body.

Fig. 9 is an enlarged side elevation of the clutch and control means for operating the truck body tilting and rotating mechanism, and Fig. 10 is a plan view thereof showing the means for limiting the extent of the application of the power from the motor to the mechanism for tilting the dump body.

Like characters of reference indicate corresponding parts in the different views.

The longitudinal members 1 of the truck chassis are provided with stringers 2 upon which is mounted a turntable frame 3 with a cross channel member 4. Superimposed above the turntable 3 is a second turntable 5 with a similar cross channel member 6 with anti-friction rollers 7 journalled on the turntable 5 and engaging the turntable 3, the truck body frame 8 being mounted on the turntable 5 so as to be capable of being slid longitudinally with respect thereto. This is achieved by providing longitudinal channels 9 and superimposed channels 10 on the body frame 8 between which are positioned rollers 11 which are mounted on shafts 12 which are, in turn, journalled on the turntable 5.

Blocks 13 with inclined rear faces 14 depend from the channels 10 and stops 15 and 16 secured in the channels 9 limit rearward and forward movement of the body frame 8. A vertical rotatable spindle 17 is journalled in the cross channels 4 and 6 and on its lower end is secured a bevel gear 18 which meshes with a bevel pinion 19 secured to a forwardly directed shaft 20 suitably journalled and which is provided, near its forward end, with a sprocket 21 connected by a sprocket chain 22 with a sprocket 23 free on a shaft 24, said sprocket 23 including a part 25 of a double dog clutch 26 which latter is slidably secured to the shaft 24. The shaft 24 is connected to a power take off shaft 27, such power take off mechanism being connected to the transmission 28 of the truck motor.

The upper end of the spindle 17 is provided with a bevel gear 29 which meshes with a bevel gear 30 on the rear end of a screw shaft 31 journalled in a trough member 32 secured to the cross channel 6 of the turntable 5. Threaded on the screw shaft 31 is a nut 33 slidable in the member 32, which nut has a cross bolt 34 extending therethrough and protruding through slots 35 in the member 32 and on which are swingably mounted diverging arms 36 which are pivotally connected at their rear ends to the body frame 8.

Surrounding the spindle 17 is a bushing 37 which extends up through the cross channel 4 and is secured to the channel 6, the lower end of the bushing 37 carrying a worm wheel 38 secured thereto and adapted to mesh with a worm 39 secured to a longitudinal shaft 40 journalled on the stringers 2 and provided, at its forward end, with a sprocket 41 connected with a sprocket 42 free on the shaft 20 by a chain 43. A larger sprocket 44 secured to the sprocket 42 and free on the shaft 20 which is connected by a sprocket chain 45 with a sprocket 46 free on the shaft 24 provides a speed reduction between the shaft 24 and the shaft 40. The sprocket 46 carries a second portion 47 of the double dog clutch 26.

The dog clutch 26 is operated preferably by means of a pivoted hand lever 48 within reach of the driver of the vehicle, which lever is connected by a link 49 as shown (see Fig. 9) with one end of a swingable double arm 50 suitably journalled, the other end of the arm 50 being connected by a link 51 with the swingable actuating lever 52 of the dog clutch 26.

A power take off actuating lever 53 is provided within reach of the driver of the vehicle and actuates a slidable pinion (not shown) in the power take off mechanism. A shaft 54 (Fig. 10) also extends rearwardly from such pinion and is provided at its rear end with a plate 55 having rearwardly extending rods 56 extending slidably through a second plate 57 mounted on a second shaft 58 which is provided with a screw forward end 59 upon which is threaded a disc 60 through which the rods 56 also freely extend. Forward and rear stops 61 and 62 are provided on the rods 56, and the forward end 59 of the shaft 58 is also provided with a plate 63 through which the rods 56 extend. The rear end of the shaft 58 is provided with a sprocket 64 connected by a chain 65 with a sprocket 66 freely mounted on the shaft 40. A larger sprocket 67 is secured to the sprocket 66 and is connected by a chain 68 with a sprocket 69 secured on the shaft 20. The sprocket gearing between the shaft 20 and the shaft 58 is for the purpose of controlling the power take off so that it is operating the shaft 20 for the time necessary to tilt or restore the body to the horizontal, such gearing cutting off the power immediately either movement is completed.

In operating the mechanism we will first describe the operation of the tilting gear:—

Assuming that the truck body is in the horizontal loaded position as illustrated in Fig. 1 and it is desired to tilt the same to dump the load, the power take off lever 53 is thrown in to give forward rotation to the shaft 27. This power take off is a standard attachment to a transmission and need not be further described than to say that the lever 53 can be operated to cause the rotation of the shaft 27 in either a forward or reverse direction.

In a forward direction the shaft 27 and its connected shaft 24 are rotated in the direction of the arrow in Fig. 9, and by actuating the dog clutch operating lever 48 rearwardly the lever 52 is moved rearwardly with the result that the rear face of the dog clutch 26 engages the portion 25 and thus through the medium of the sprocket 23, chain 22 and sprocket 21 rotates the shaft 20 in the same direction as the shaft 24. The gear 18, spindle 17 and gear 29 are, therefore, rotated in a counter-clockwise direction and through the medium of the gear 30 the screw shaft 31 is rotated in the direction of the arrow (Fig. 7) with the result that the nut 33 is drawn rearwardly.

During the initial period that the nut 33 is being drawn rearwardly as the arms 36 are substantially horizontal they thrust rearwardly the body frame 8 until the inclined faces 14 of the blocks 13 mount the intermediate rollers 11 when the body frame begins to tilt. This produces a degree of angularity between the arms 36 and the screw shaft 31 and subsequent movement rearwardly of the nut 33 causes the arms 36 to tilt the body frame 8 and body into the tilted or dumping position. The blocks 16 limit the rearward movement of the body frame.

To restore the body to the normal horizontal position through the medium of the lever 53 the direction of rotation of the shaft 27 is reversed and consequently the entire drive for the screw shaft 31 is reversed as well as the direction of rotation of the shaft 31 itself. Therefore, the nut 33 will be moved forwardly and through the medium of the arms 36 swinging down the body and drawing it forwardly until it assumes the position illustrated in Fig. 1. The rear stops 15 engaging the rear rollers limit the forward movement of the body frame 8.

To swing the body horizontally so that it is in a position to dump over the sides of the truck rather than over the back, the lever 53 is thrown in to rotate the power take off shaft 27 in the required direction and the lever 48 is thrown forwardly to cause the double clutch 26 to engage the forward portion 47 and thus cause the shaft 24 to rotate the shaft 40 through the medium of the intermediate sprocket gearing which is provided for the purpose of securing speed reduction.

The shaft 40 carrying the worm 39 rotates the intermeshing worm wheel 38 and through the medium of the bushing 37 rotates the turntable 5 thus rotating the body frame 8. To swing it back into the initial position it is only necessary, through the lever 53, to change the direction of rotation of the power take off shaft 27 when the remaining gearing will be reversed in direction.

To prevent the lift mechanism from overriding itself in lifting or restoring the body frame to its normal position the shaft 54 (Fig. 10) and its associated mechanism is provided, the shaft 58 being rotated synchronously with the shaft 20 in order to move the disc 60 forwardly or rearwardly a sufficient extent to engage the stops 61 or 62 and thus push forward or rearwardly the shaft 54 to throw the power take off out of operation when the lift mechanism has reached the limit of its movement.

As many modifications may be made in the invention without departing from the spirit of the same or the scope of the claims, the form shown is to be taken in an illustrative and not in a limiting sense.

What we claim as our invention is:

1. In a dump truck, the combination with the truck chassis, truck motor and a power shaft operatively connected with the truck motor, of a turntable rotatably mounted on the truck chassis, a dump body slidably and tiltably mounted on the turntable, means on the turntable for sliding and tilting the body and restoring it to its initial horizontal load carrying position, independent gearing on the truck chassis operatively connected to the turntable and the sliding and tilting means for actuating the body, and clutch means interposed between the gearing and the power shaft for alternatively actuating the gearing to turn the turntable and for actuating the other gearing to slide and tilt the body.

2. In a dump truck as claimed in claim 1, a vertical rotatable spindle mounted on the truck chassis, a screw shaft rotatably mounted on the turntable, a nut on said screw shaft, a lever connection between the nut and the dump body, a gear on said screw shaft, a gear on the spindle meshing therewith, a second gear on the spindle, and a gear meshing therewith operatively connected with the power shaft through the medium of the clutch means.

3. In a dump truck as claimed in claim 1, power cut off means interposed in the gearing operatively connected to the dump body sliding and tilting means for automatically rendering such gearing inoperative upon the body reaching the limits of its movement.

JAMES L. ALEXANDER.
EDWIN RUSSELL EATON.